(12) United States Patent
Murdoch (10) Patent No.: US 6,799,662 B1
(45) Date of Patent: Oct. 5, 2004

(54) SPRING-ACTUATED, HYDRAULICALLY RELEASABLE BRAKES

(75) Inventor: Allan R. Murdoch, Kelowna (CA)

(73) Assignee: Hillmar Industries Ltd., Vancouver (CA)

( * ) Notice: Subject to any disclaimer, the term of this patent is extended or adjusted under 35 U.S.C. 154(b) by 0 days.

(21) Appl. No.: 10/434,347

(22) Filed: May 9, 2003

(51) Int. Cl.$^7$ ................................................ F16D 65/56
(52) U.S. Cl. ...................... 188/72.9; 188/71.9; 188/72.8
(58) Field of Search .............................. 188/71.8, 71.9, 188/72.7, 72.8, 72.9, 170, 196 BA, 196 D, 196 F, 196 V (56) References Cited

U.S. PATENT DOCUMENTS 3,900,084 A * 8/1975 Farr ........................ 188/196 F
5,076,401 A * 12/1991 Ta et al. ..................... 188/71.9
5,219,047 A * 6/1993 Fouileux et al. ........... 188/71.9

* cited by examiner

Primary Examiner—Chris Schwartz (57) ABSTRACT

A spring-actuated, hydraulically releasable brake has a brake disc extending between first and second brake pads, a spring assembly urging the first pad towards the brake disc, a hydraulic piston and cylinder assembly for causing a brake releasing displacement of the first pad from the brake disc against the action of the spring assembly and a brake wear adjustment mechanism including an adjustable connection between the first brake pad and the piston and cylinder assembly, a force transmitting motion amplifier responsive to the releasing displacement, a rotatably adjustable connection provided between the piston and the first brake pad and operatively controlled by the force transmitting motion amplifier and a lost motion connection and a one-way clutch between the motion amplifier and the adjustable connection.

21 Claims, 8 Drawing Sheets

SPRING-ACTUATED, HYDRAULICALLY RELEASABLE BRAKES

BACKGROUND OF THE INVENTION

1. Field of the Invention

The present invention relates to brakes and, more particularly, to spring-actuated, hydraulically releasable brakes, including single spring stack sliding caliper brakes and dual spring stack fixed caliper brakes.

2. Description of the Related Art

Spring-actuated, hydraulically releasable brakes are known which employ actuating springs to urge brake pads against brake discs and hydraulic piston and cylinder assemblies for releasing the brake pads from fictional engagement with the brake discs against the action of the springs.

After repeated use, the brake pads become worn and consequently the effectiveness of the brakes is reduced. However, due to the high braking capacities, direct acting functions and small retracted lining clearances of spring-actuated, hydraulically releasable brakes, automatic wear adjusters have not been common in such brakes. Not only does lack of adjustment of the brakes result in reduced braking capacities, but it can also severely reduce the fatigue life of the actuating springs. It has therefore usually been necessary to counteract brake pad or lining wear by manual adjustment of the brakes. However, manual brake adjustment is time-consuming and risky.

BRIEF SUMMARY OF THE INVENTION

It is, accordingly, an object of the present invention to provide a novel and improved spring-actuated, hydraulically releasable brake which is maintained in proper adjustment, regardless of lining wear and without manual adjustment of the brake.

According to the present invention, there is provided a spring-activated, hydraulically releasable brake having first and second brake pads, located at opposite sides of a brake disc, with springs urging the first brake pad against the brake disc, a hydraulic piston and cylinder assembly operable to displace the first pad from the brake disc against the action of the springs, and an automatic brake adjustment mechanism responsive to the amount of the displacement of the first brake pad from the brake disc by the hydraulic piston and cylinder assembly for adjusting the first brake pad toward the brake disc when such displacement exceeds a determined amount.

In a preferred embodiment of the invention, the automatic brake adjustment mechanism includes a pivotable member in the path of movement of the piston of the hydraulic piston and cylinder assembly, and a link extending between the pivotable member and a one-way clutch. A lost motion connection is provided between the linkage and the one-way clutch, so that the latter is operated to rotate a shaft extending from the one-way clutch to the piston rod of the piston only when the predetermined amount of the displacement is exceeded. A threaded connection is provided between the shaft and the piston rod, so that rotation of the piston rod shaft causes longitudinal adjustment movement of the piston rod and, therewith, of the first brake pad toward the brake disc.

BRIEF DESCRIPTION OF THE DRAWINGS

The invention will be more readily understood from the following description of preferred embodiments thereof given, by way of example only, with reference to the accompanying drawings, in which:

FIG. 2B shows a plan view of the brake as shown in FIG. 2B;

DESCRIPTION OF THE PREFERRED EMBODIMENTS

Figure 1A:
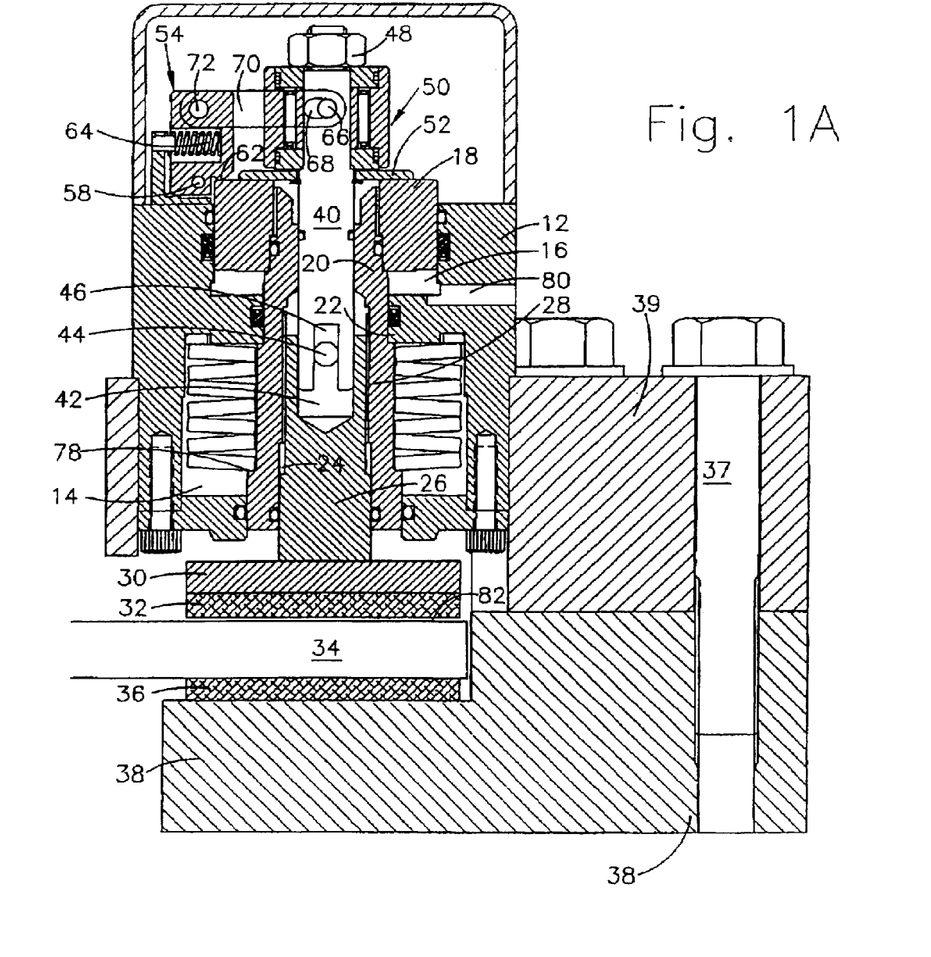
FIG. 1A shows a view taken in vertical cross-section through a spring-actuated, hydraulically releasable brake embodying the present invention in a released condition.
Figure 1B:
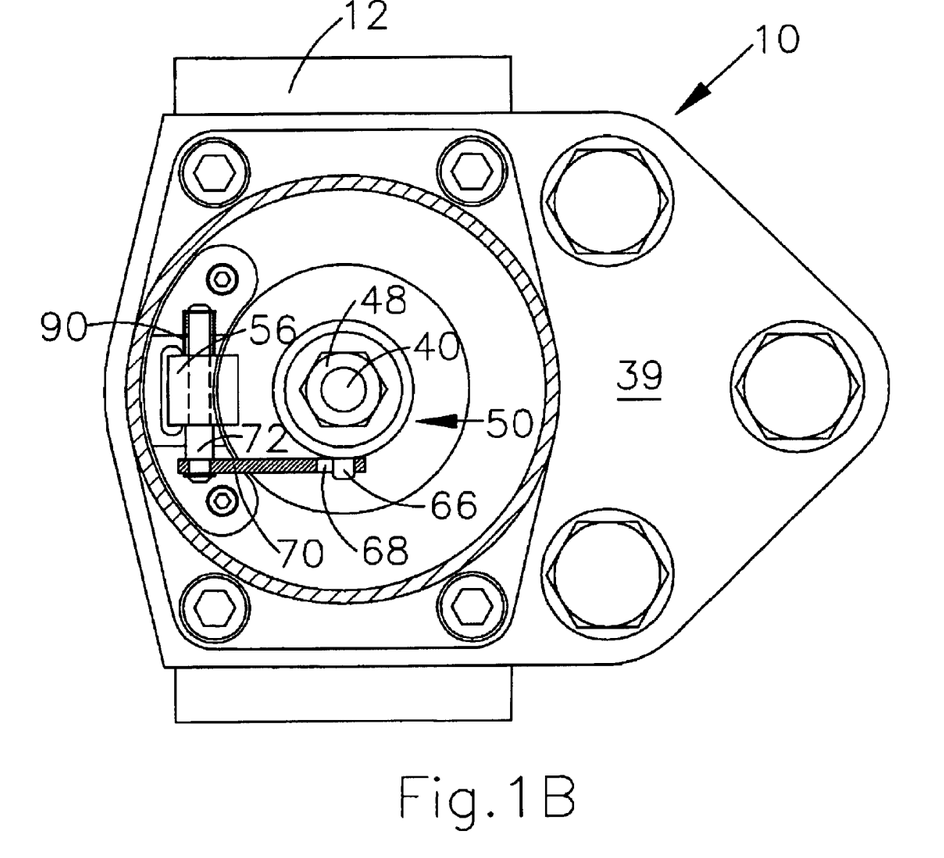
FIG. 1B shows a plan view of the brake as shown in FIG. 1A.

In FIGS. 1A and 1B there is shown a single spring stack sliding caliper brake indicated generally by reference numeral 10 which has a brake body 12 formed with a downwardly-open cylindrical recess 14 and with an upwardly open cylindrical recess 16. A piston 18 in the cylindrical recess 16 has a piston rod 20 which extends downwardly from the piston 18 through an intermediate cylindrical boring 22 into the cylindrical recess 14.

The piston rod 20 has a downwardly-open axial opening 24 and is connected to a plunger 26 by an adjustable connection in the form of screw threads 28 formed on the interior of the piston rod 20 and the exterior of the plunger 26. At its lower end, the plunger 26 has a backing plate 30, on which is provided a first brake lining or pad 32. A brake disc 34 extends between the first brake pad 32 and a second brake lining or pad 36 on a caliper arm 38.

A shaft 40, which is coaxial with the piston rod 20 and the plunger 26, extends downwardly into an upwardly open recess 42 in the plunger 26 and is longitudinally slidably connected to the plunger 26 by means of a transverse pin 44 extending through the plunger 26 and through a downwardly open slot 46 in the lower end of the shaft 40.

A hexagonal nut 48, in threaded engagement with the upper end of the shaft 40, secures a one-way clutch, indicated generally by reference numeral 50, between the nut 48 and a disc 52 seated on the top of the piston 18.

Figure 4:
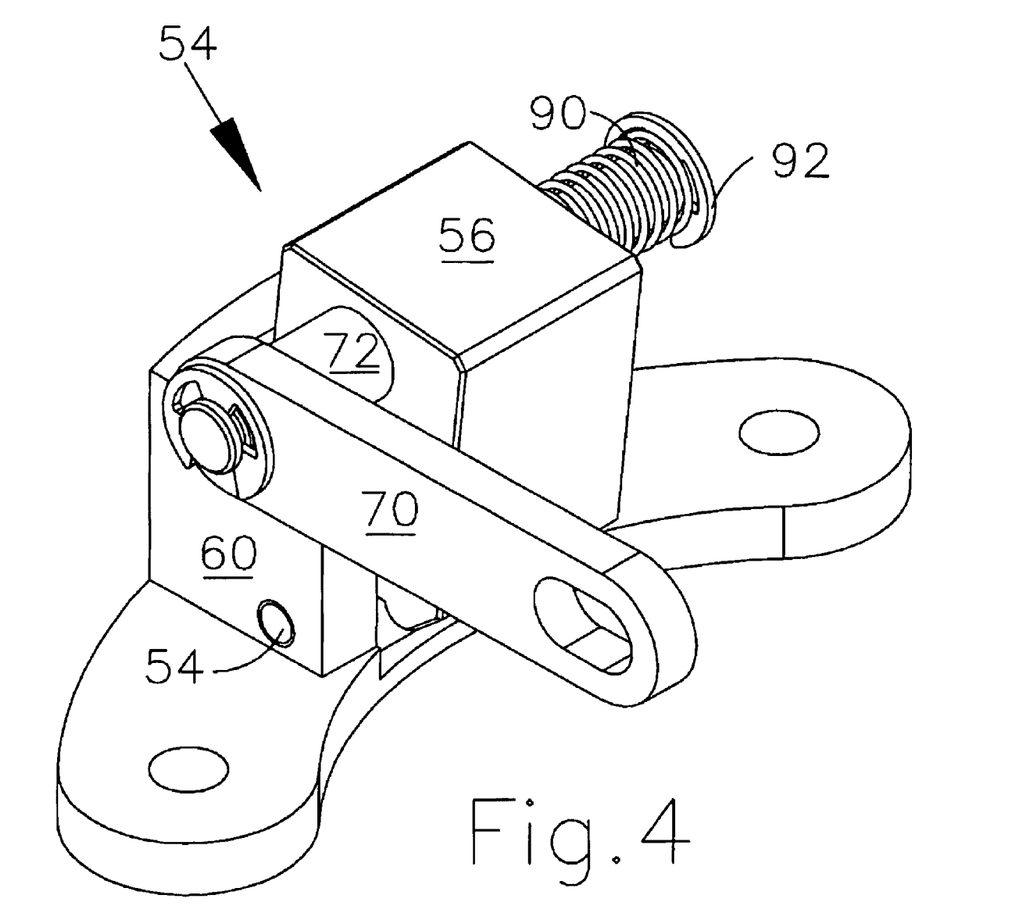
FIG. 4 shows a view in perspective of a mechanical motion sensor in perspective.

A mechanical force transmitting motion amplifier, indicated generally by reference numeral 54, is mounted on the brake body 12, and is illustrated in greater detail in FIG. 4. As shown in FIG. 4, the motion amplifier 54 has a pivotable member or block 56, which is pivotal about a pivot pin 58, opposite ends of which are secured in a bracket 60 mounted on the brake body 12. As shown in FIG. 1A, the pivotal block 56 is undercut at its lower side to form a projecting nose 62, which rests on the top of the piston 18 so that, as the piston 18 is displaced upwardly, the pivotal block 56 pivots in an anticlockwise direction, as viewed in FIG. 1A, about the pivot pin 58. The pivotal block 56 is biased in a clockwise direction about the pivot pin 58 by a helical compression spring 64 acting between the bracket 60 and the pivotable block 56, so that the nose 62 is pressed against the top of the piston 18.

The shaft 40 is provided with a projecting adjustment pin 66 which extends into a slot 68 formed in one end of a link 70, the opposite end of which is secured to a pivot pin 72 extending through the pivotable block 56. Consequently, the pivotal movement of the pivotable block 56 causes the link 72 move relative to the pin 66, as described in greater detail below. The pin 66 and the slot 68 form a lost motion connection between the link 70 and the one way clutch 50.

The plunger 26, and therewith the backing plate 30 and the first brake pad 52, are urged toward the brake disc 34 by an assembly of disc springs 76 provided in the cylindrical recess 14, the lower end of this assembly being seated on an annular shoulder 78 on the lower end of the piston rod 20.

The operation of the brake 10 is as follows:

When hydraulic fluid is supplied under pressure through a hydraulic port 80 into the cylindrical recess 16, the piston 18 is displaced upwardly, as viewed in FIG. 1A, and the piston rod 20 and, therewith, the first brake pad 32 are raised against the action of the springs 76 to provide a clearance 82 between the first brake pad 32 and the brake disc 34. The consequential pivotation of the pivotal block 56 displaces the link 70 to the left, so that the pin 66 becomes located at the right-hand end of the slot 68.

The pivotal block 56 thereby acts as a force transmitting motion amplifying lever, which causes the movement of the link 70 to be amplified with respect to the upward displacement of the piston 18. Therefore, the relatively small clearance 82 between the first brake pad 32 and the brake disc 34 is amplified by the motion amplifier 54 to an amount which can be better utilized for adjustment of the brake and which makes the adjustment less sensitive to manufacturing clearances and additional clearances between moving parts caused by wear.

Figure 2A:
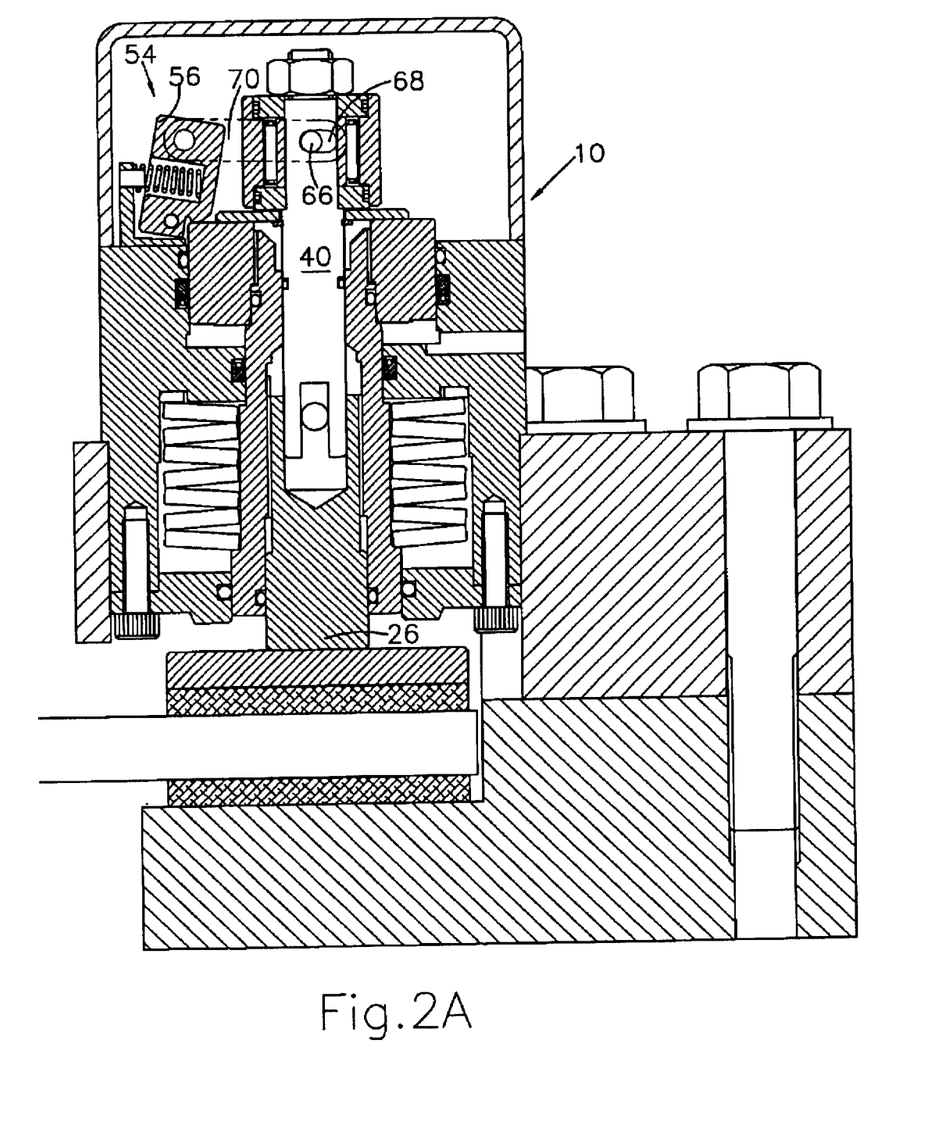
FIG. 2B shows a view corresponding to that of FIG. 1A, but with the brake in a spring-actuated condition.

When the hydraulic pressure is removed, the springs 76 urge the first brake pad 32 against the brake disc 34, so that the clearance between them is reduced to zero. The link 70 is thereby displaced to the right, as shown in FIG. 2A, so that the pin 66 becomes located at the left-hand end of the slot 68. The length of the slot 68 is selected to correspond to the amount of the displacement of the link 70 when the brake 10 is properly adjusted. Consequently, when the brake is fully adjusted, no motion is transferred from the link 70 to the adjusting pin 66.

Figure 3A:
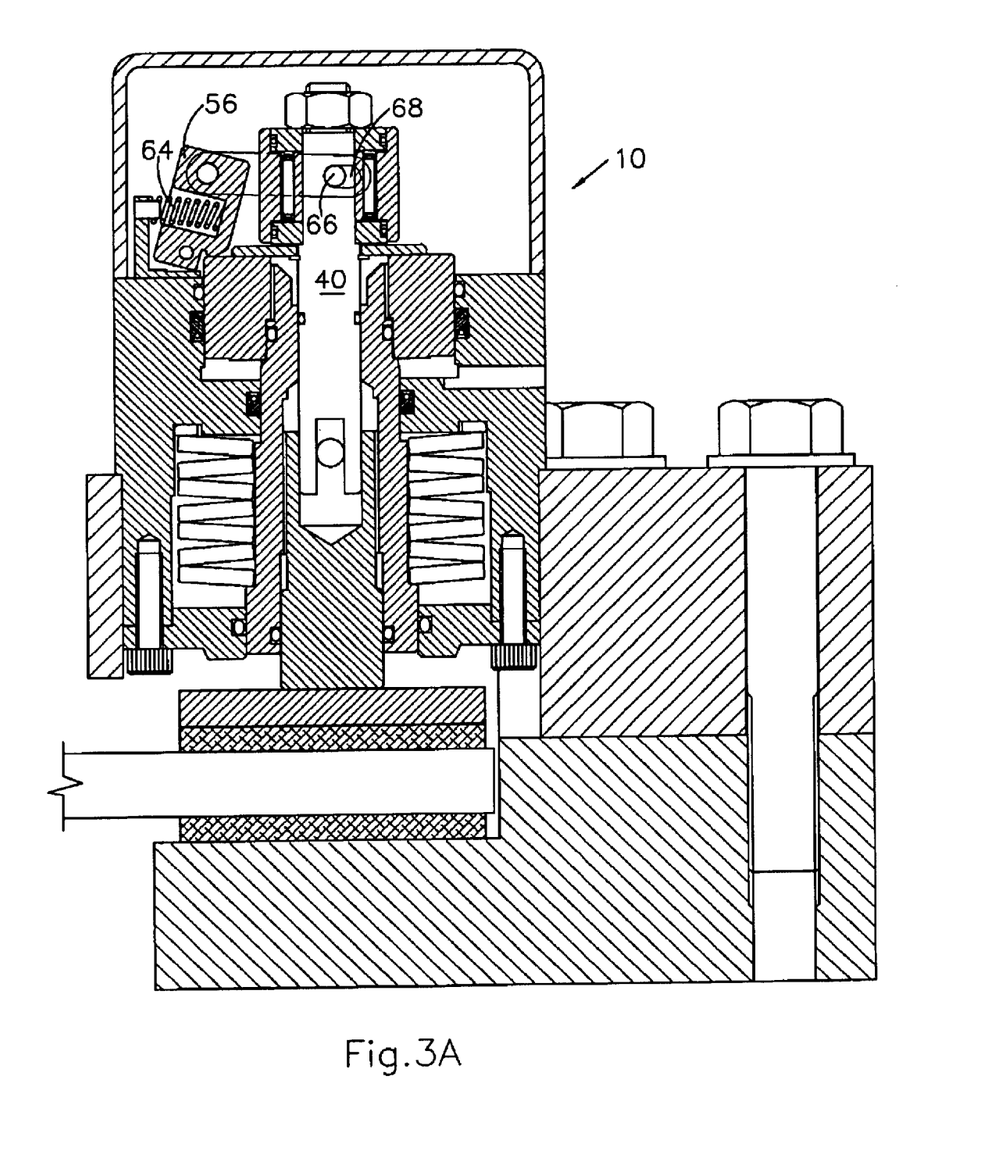
FIG. 3A shows a view corresponding to that of FIG. 1A, but with the brake out of adjustment.
Figure 3B:
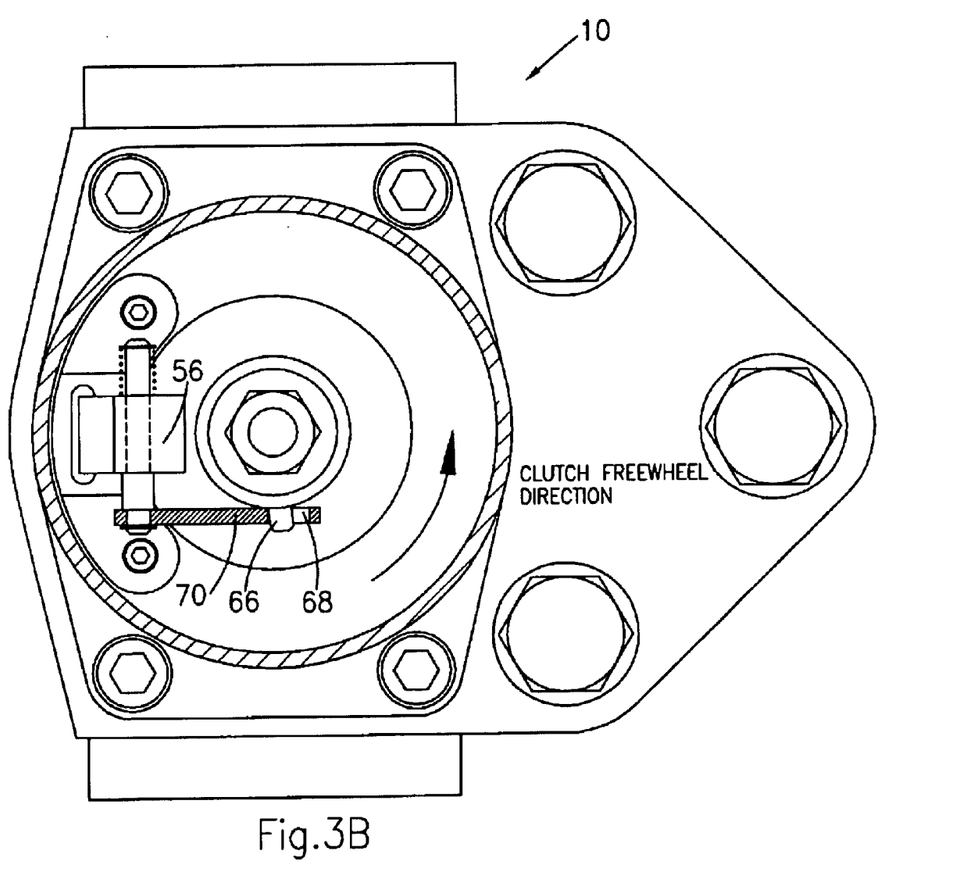
FIG. 3B shows a plan view of the brake as shown in FIG. 3A.

FIG. 3A shows the brake 10 with the hydraulic pressure removed, so that the brake is spring-applied. In this case, the operation of the brake has caused wear of the brake pad 32, and the brake 10 is therefore out of adjustment by the amount of the wear of the brake pad 32. This wear causes extra downward displacement of the piston 18, and consequentially provides movement to the right of the link 70 through a distance greater than the length of the slot 68, so that the adjusting pin 66 is correspondingly deflected to the right, by the action of the spring 64 acting through the link 70. The force thereby applied to the link 70 is sufficient to cause rotation of an outer case 86 of the one-way clutch 50.

Figure 2B:
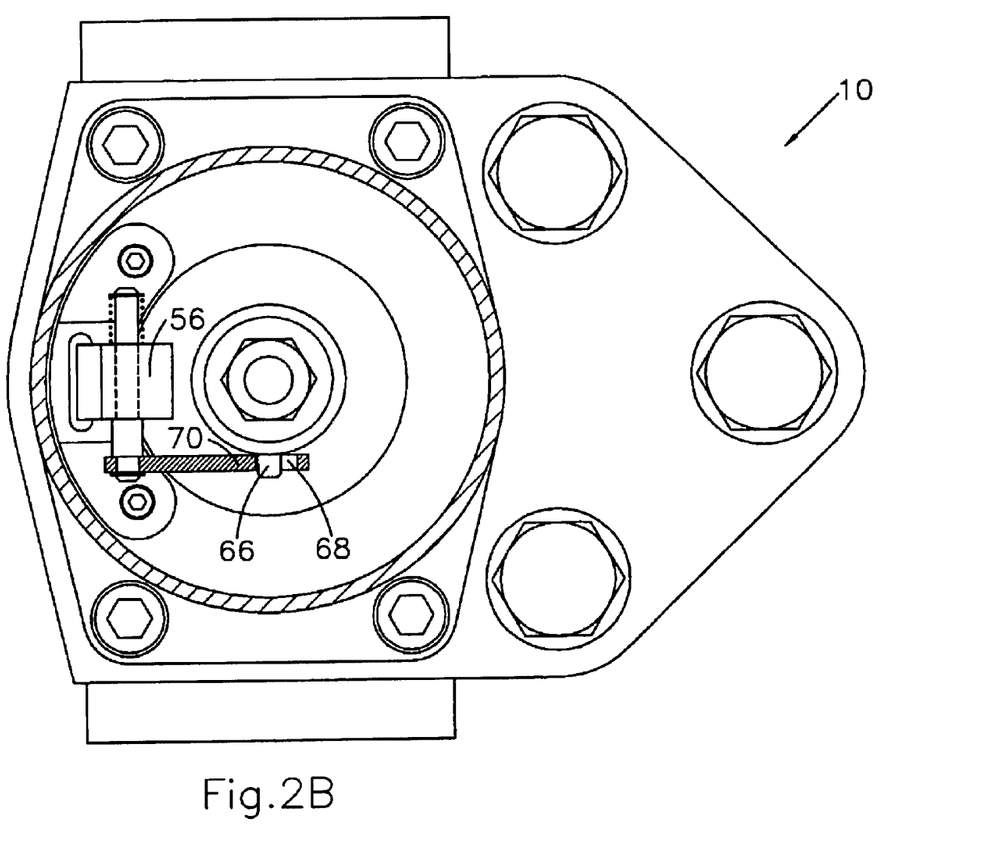

When the brake 10 is next released, hydraulic pressure is again applied to the piston 18, thereby returning the pivotal block 56 and the link 70 to the positions in which they are shown in FIGS. 2A and 2B. Although the piston 18 may extend to an out of adjustment condition, it always returns to the same position on release of the brake.

The adjusting pin 66 and, thereby, the outer case 86 of the one-way clutch 50 are subsequently deflected in the opposite direction during the motion of the piston 18 on release of the brake 10, and the one-way clutch 50 is thereby locked, to cause the outer case 86 to be locked to the shaft 40, so that the shaft 40 is correspondingly rotated until the piston motion is complete.

This rotation of the shaft 40 is transmitted through the pin 44 to the plunger 26, and as a result of the threaded engagement of the screw threads 28 on the plunger 26 and the piston 20, the plunger 26 is thereby adjusted longitudinally relative to the piston rod 20 toward the brake disc 34, thereby reducing the amount of the out of adjustment. The piston rod 20 is retained by the action of the springs 76 from rotating with the shaft 40.

This automatic adjustment will continue during the subsequent cycles of operation of the brake until the motion of the link 70 is equal to the length of the slot 68 and, therefore, no further deflection of the adjusting pin 66 occurs.

As shown in FIG. 4, a compression spring 90 is provided between the pivotal block 56 and a spring clip 92 at one end of the pivot pin 72. The compression spring 90 biasses the link 70 axially of the pivot pin 72 towards the one-way clutch 50 to maintain the interengagement of the pin 66 and the slot 68, and the pivot pin 72 can be manually displaced axially of the pivot pin 72 against the action of the spring 90 to disengage the link 70 from the adjustment pin 66 and thereby to disengage the lost motion connection between the link 70 and the one-way clutch 50. Manual adjustment of the brake can then be effected by using the hexagonal nut 48 to turn the one-way clutch 50. Such manual adjustment is required for approximate initial adjustment of the brake and for returning the plunger 26 to a fully retracted position when the brake pads 32 and 36 are replaced.

Figure 5:
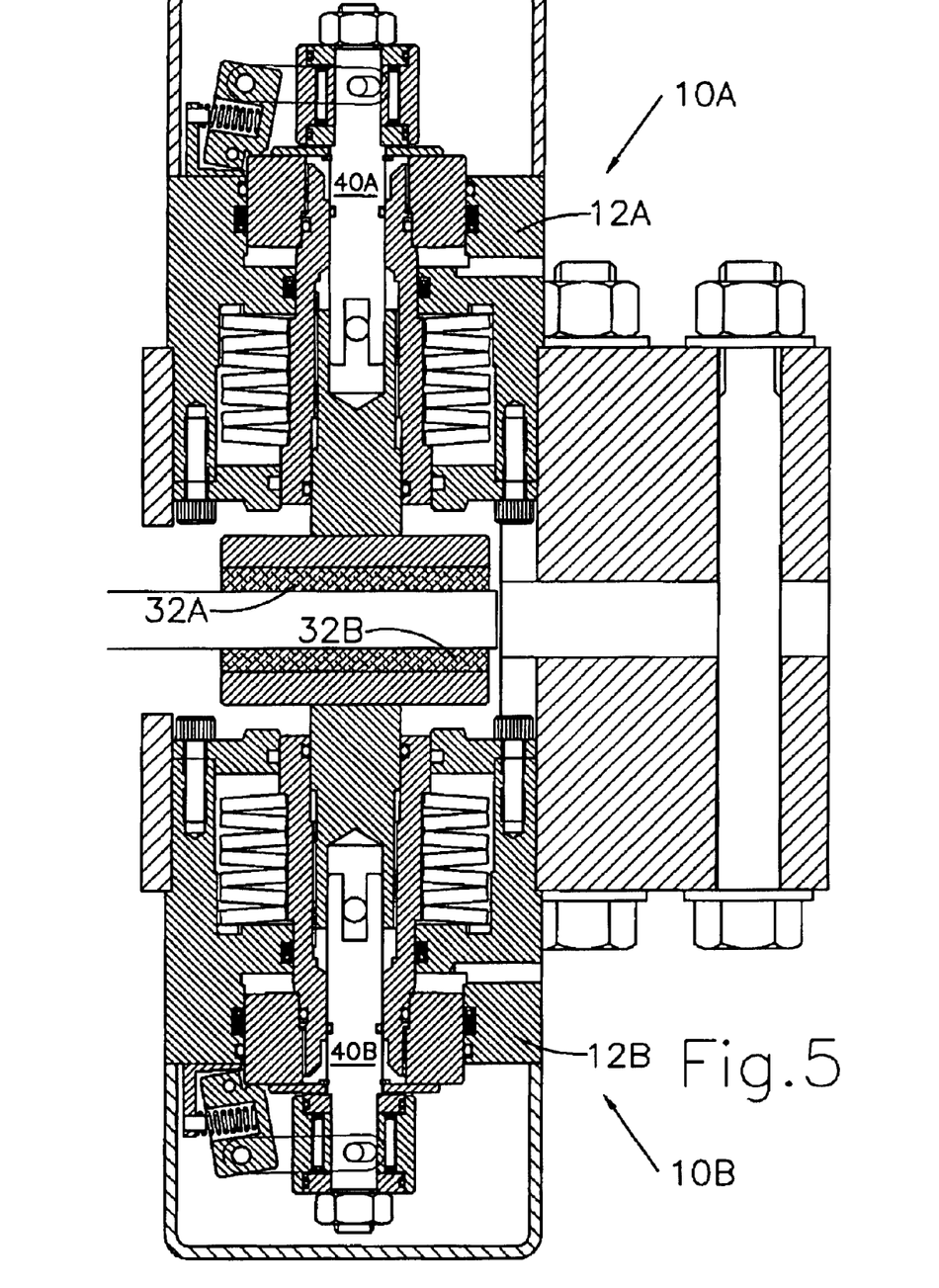
FIG. 5 shows a view in vertical cross-section through a dual spring stack caliper

FIG. 5 shows a dual spring stack fixed caliper brake which comprises two brake mechanisms, indicated generally by reference numerals 10A and 10B, which as will be readily apparent each correspond to the above-described brake 10, and in which components identical to those described above with reference to FIG. 1A have, for convenience of illustration, being indicated by reference numerals which correspond to those of FIG. 1A, with the addition of the suffixes A and B.

In FIG. 5, the second brake pad 36 and the caliper arm 38 of FIG. 1A are replaced by the brake mechanism 10B, the brake mechanisms 10A and 10B being mounted at opposite sides of the brake disc 34.

As will be apparent to those skilled in the art, other modifications may be made in the above-described invention within the scope of the appended claims.

I claim:

1. A spring-actuated, hydraulically releasable brake, comprising:

first and second brake pads;

a brake disc extending between the first and second brake pads;

a spring assembly urging the first pad toward the brake disc;

a hydraulic piston and cylinder assembly operable to effect a brake releasing displacement of the first brake pad from the brake disc against the action of the spring assembly and comprising a piston having a longitudinal axis; and brake adjustment means responsive to the amount of the brake releasing displacement for adjusting the first brake pad toward the brake disc so as to counteract wear of the first brake pad, wherein said brake adjustments means comprises means for exerting a force acting at 90 degrees to said longitudinal axis for effecting the adjustment of the first brake pad.

2. A spring-actuated, hydraulically releasable brake as claimed in claim 1, wherein the hydraulic piston and cylinder assembly comprises a piston and a piston rod extending between the piston and the first brake pad, an adjustable connection is provided between the first brake pad and the piston rod and the brake adjustment means comprises means for adjusting the adjustable connection.

3. A spring-actuated, hydraulically releasable brake as claimed in claim 2, wherein the brake adjustment means comprise motion amplifying means responsive to displacement of the piston for transmitting an amplification of such displacement.

4. A spring-actuated, hydraulically releasable brake as claimed in claim 3, wherein a threaded connection is provided between the brake pad and the piston rod, and including means controlled by the motion amplifying means for rotatably adjusting the threaded connection.

5. A spring-actuated, hydraulically releasable brake as claimed in claim 1, wherein the brake adjustment means include mechanical motion sensing means responsive to the operation of the hydraulic piston and cylinder assembly.

6. A spring-actuated, hydraulically releasable brake, comprising:
first and second brake pads;
a brake disc extending between the first and second brake pads;
a spring assembly urging the first pad toward the brake disc;
a hydraulic piston and cylinder assembly operable to effect a brake releasing displacement of the first brake pad from the brake disc against the action of the spring assembly;
the hydraulic piston and cylinder assembly comprising:
a piston; and
a piston rod extending between the piston and the brake pad;
brake adjustment means responsive to the amount of the brake releasing displacement for adjusting the first brake pad toward the brake disc so as to counteract wear of the first brake pad;
the brake adjustment mechanism comprising a motion amplifying means responsive to displacement of the piston for transmitting an amplification of such displacement, a threaded connection provided between the brake pad and the piston rod and means controlled by the motion amplifying means for rotatably adjusting the threaded connection and comprising a one-way clutch between the mechanical motion amplifying means and the piston.

7. A spring-actuated, hydraulically releasable brake as claimed in claim 6, including a plunger carrying the first brake pad, the threaded connection being provided between the piston rod and the plunger.

8. A spring-actuated, hydraulically releasable brake as claimed in claim 7, wherein a lost-motion connection is provided between the motion amplifying means and the one-way clutch.

9. A spring-actuated, hydraulically releasable brake as claimed in claim 6, including a shaft coaxial with the piston rod, and a connection between the shaft and the piston rod which allows relative longitudinal sliding movement of the shaft and the piston rod, the shaft extending between the one-way clutch and the piston rod.

10. A spring-actuated, hydraulically releasable brake as claimed in claim 6, wherein the motion amplifying means comprise a lever which is pivotable in response to the operation of the hydraulic piston and cylinder assembly, and a link between the pivotal member and the one-way clutch, and wherein a lost-motion connection is provided between the link and the one-way clutch.

11. A spring-actuated, hydraulically releasable brake, comprising:
first and second brake pads;
a brake disc extending between the first and second brake pads;
a spring assembly urging the first pad toward the brake disc;
a hydraulic piston and cylinder assembly operable to effect a brake releasing displacement of the first pad from the brake disc against the action of the spring assembly; and
a brake wear adjustment mechanism;
the brake wear adjustment mechanism comprising an adjustable connection between the first brake pad and the piston and cylinder assembly, a force transmitting motion amplifier responsive to the releasing displacement and an adjustable connection provided between the piston and the first brake pad and operatively controlled by the force transmitting motion amplifier, and
a plunger connected to the first brake pad, the adjustable connection comprising a threaded connection between the piston and the plunger and the brake wear adjustment mechanism including a one-way clutch connected between the plunger and the force transmitting motion amplifier.

12. A spring-actuated, hydraulically releasable brake as claimed in claim 11, wherein the force transmitting motion amplifier comprises a pivotable member in the path of movement of the piston.

13. A spring-actuated, hydraulically releasable brake as claimed in claim 12, wherein the brake wear adjustment mechanism includes a link connected to the pivotable member and a lost motion connection between the link and the one-way clutch.

14. A spring-actuated, hydraulically releasable brake as claimed in claim 13, including a spring biassing the link into engagement with the one-way clutch, the link being displaceable against the action of the spring to allow disengagement of the lost motion connection.

15. A spring-actuated, hydraulically releasable brake as claimed in claim 14, including a further spring biassing the pivotable member towards the piston.

16. A spring-actuated, hydraulically releasable brake as claimed in claim 12, including a spring biassing the pivotable member towards the piston.

17. A spring-actuated, hydraulically releasable brake, comprising:
first and second brake pads;
a brake disc extending between the first and second brake pads;
a spring assembly urging the first pad toward the brake disc;
a hydraulic piston and cylinder assembly operable to effect a brake releasing displacement of the first brake pad from the brake disc against the action of the spring assembly and comprising a piston having a longitudinal axis;
a motion amplifier;
the motion amplifier comprising a lever pivotable in response to displacement of the piston, a link member and a pivotable connection between the link and the lever member;

a threaded connection between the piston and the first brake pad;

a lost motion connection and a clutch between an opposite end of the link and the first brake pad.

18. A spring-actuated, hydraulically releasable brake as claimed in claim 17, including a shaft co-axial with the piston rod, the lost motion connection comprising a slot in said opposite end of the link and a pin projecting from the shaft into the slot.

19. A spring-actuated, hydraulically releasable brake as claimed in claim 18, including a plunger extending from the first pad and co-axial with the piston rod and a threaded connection between the plunger and the piston rod.

20. A spring-actuated, hydraulically releasable brake as claimed in claim 18, including a pin and a slot connecting the shaft and the plunger, the shaft and the plunger being longitudinally slidably connected by the pin and the slot.

21. A spring-actuated, hydraulically releasable brake as claimed in claim 18, wherein the link extends at 90 degrees relative to the shaft.

* * * * *